United States Patent [19]

Mueller

[11] 4,171,282
[45] Oct. 16, 1979

[54] FLUORINATED NONIONIC SURFACTANTS

[75] Inventor: Karl F. Mueller, New York, N.Y.

[73] Assignee: Ciba-Geigy Corporation, Ardsley, N.Y.

[21] Appl. No.: 858,218

[22] Filed: Dec. 7, 1977

[51] Int. Cl.$^2$ .................... B01F 17/36; C07C 69/40
[52] U.S. Cl. .................... 252/356; 252/8.05; 252/8.57; 252/DIG. 1; 560/153; 560/154
[58] Field of Search .............. 252/356, 8.05, DIG. 1; 560/153, 154; 260/535 P

[56] References Cited

U.S. PATENT DOCUMENTS

| | | | |
|---|---|---|---|
| 2,341,846 | 2/1944 | Meincke | 252/356 X |
| 3,172,910 | 3/1965 | Brace | 252/356 X |
| 3,471,518 | 10/1969 | Hager | 560/153 X |
| 3,706,787 | 12/1972 | Hager | 560/153 |
| 4,042,522 | 8/1977 | Falk | 252/356 X |
| 4,069,244 | 1/1978 | Mueller | 260/501.12 |

Primary Examiner—Richard D. Lovering
Attorney, Agent, or Firm—Michael W. Glynn

[57] ABSTRACT

The perfluoroalkylthio-substituted half esters and amides of succinic acid having the formula

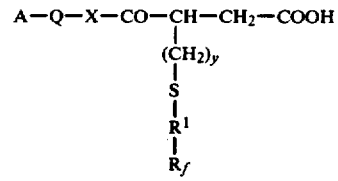

wherein $R_f$ is a perfluoroalkyl, $R^1$ alkylene optionally interrupted with oxygen, sulfur or nitrogen atom, X is oxygen or NH, y is zero or 1, Q is a polyether or polyester diradical moiety having a molecular weight of 300 to 5000 or a polysiloxane having 5 to 80 repeating units and A is hydrogen, hydroxyl, amino, alkoxy of 1 to 21 carbons, phenoxy, alkylphenoxy of 7 to 20 carbons, dialkylamino where each alkyl has 1 to 18 carbons or the group

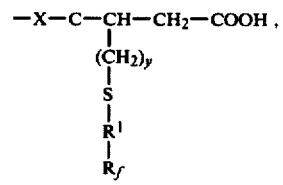

said compounds being prepared by first reacting maleic anhydride with a polyether, polyester, diamine or a polysiloxane derivative of an alcohol or a primary amine and then reacting the product with a perfluoroalkyl alkylene thiol. The novel compounds are useful as surfactants with specific applications as wetting agents in coatings, waxes, emulsions, paints and resins.

8 Claims, No Drawings

FLUORINATED NONIONIC SURFACTANTS

BACKGROUND OF THE INVENTION

U.S. Pat. No. 3,621,059 describes amides derived from hexafluoropropylene oxide polymer acids and polyalkylene oxide having the formula:

wherein $R_f$ is a perfluoroalkyl radical having one to eight carbon atoms, n is an integer of zero to 100; $R^1$ is an alkylene radical having two to 12 carbon atoms; $R^2$ is hydrogen or an alkyl radical having one to four carbon atoms; $R^3$ is hydrogen or an alkyl radical having one to four carbon atoms, at least one of $R^2$ and $R^3$ in each repeating unit being hydrogen; y is an integer of one to 60; $R^4$ is hydrogen or an alkyl radical having one to four carbon atoms, and $R^5$ is hydrogen or an alkyl radical having one to six carbon atoms. These amides function efficiently as surfactants and emulsifying agents. All these surfactants are derived from hexafluoropropylene oxide.

Albrecht et al. in the U.S. Pat. No. 2,915,554 disclose perfluoro alkanesulfonamides having the formula:

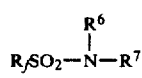

in which $R_f$ is a perfluoroalkyl group having from four to twelve carbon atoms; $R^6$ is a member of the group consisting of hydrogen, lower alkyl radicals and $R^7$ and $R^7$ in a polyoxyalkyl group having the formula:

in which m is an integer from 2 to 3, n is a number from 2 to about 20, and each R" is hydrogen or a methyl radical.

These sulfonamides serve as surface-active agents. The presence of an $SO_2$ group is required in all cases.

Other nonionic fluorochemical surfactants have been described in German Offenlegungsschriften Nos. 2215388; 2261681.

It has now been found that a large variety of useful nonionic fluorinated surfactants can easily be prepared without the necessity of an alkylation reaction and without the need for preparing an intermediate perfluoroalkyl substituted acid, by base catalyzed addition of an $R_f$-substituted thiol to the maleic or fumaric half ester or half amide containing a hydrocarbon, polyethylene oxide or polysiloxane group in the ester or amide moiety. It is a further advantage, and contributing to the superiority of these novel compounds, that they can be especially tailored for specific systems, that is, their compatibility with a given system, be it aqueous or organic, can be optimized, and even structural elements can be matched, by selecting the proper nonionic derivative for the synthesis.

Synthesis of these novel surfactants is conveniently carried out in two steps: the first involves the ring-opening reaction of maleic anhydride with a polyether, polyester diol, diamine or polysiloxane derivative which may be either an alcohol or a primary amine [and may also contain hydrophobic segments such as aliphatic or aromatic hydrocarbon groups or polypropylene oxide segments]. The second step consists of a base catalyzed addition of a perfluoroalkyl substituted thiol onto the maleic double bond, carried out in a suitable solvent or in bulk.

The novel surfactants contain a carboxy group and are soluble in dilute mineral acid solution and thus behave like non-ionic surfactants. At basic pH, the carboxy groups contribute to increased solubility.

DETAILED DISCLOSURE

This invention is directed to the perfluoroalkyl substituted half esters and amides having the formula:

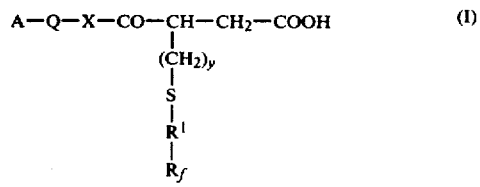

wherein $R_f$ is straight or branched chain perfluoroalkyl of 4 to 18 carbon atoms or said perfluoroalkyl substituted by perfluoroalkoxy of 2 to 6 carbon atoms, $R^1$ is branched or straight chain alkylene of 1 to 12 carbon atoms, alkylenethioalkylene of 2 to 12 carbon atoms, alkyleneoxyalkylene of 2 to 12 carbon atoms or alkyleneiminoalkylene of 2 to 12 carbon atoms where the nitrogen atom contains as a third substituent, hydrogen or alkyl of 1 to 6 carbon atoms, X is oxygen or NH, y is 1 or zero, Q is a polyether or polyester diradical moiety having a molecular weight of 300 to 5000 or a polysiloxane having 5 to 80 repeating units, and A is hydrogen, hydroxyl, amino, alkoxy of 1 to 21 carbons, phenoxy, alkylphenoxy of 7 to 20 carbons, dialkylamino where each alkyl has 1 to 18 carbons or the group

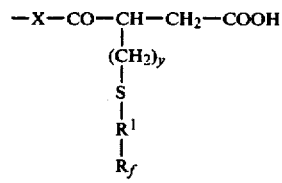

Preferably $R_f$ is a straight or branched chain perfluoroalkyl of 6 to 12 carbon atoms, $R^1$ is alkylene of 1 to 6 carbons and most preferably ethylene, y is zero, Q is a polyalkylene oxide having from 10 to 50 repeating units, such as polyethylene oxide, and A is hydroxyl, amino, methoxy or alkylphenoxy of 7 to 15 carbon atoms.

The compounds of this invention can be conveniently prepared by a two-step method. The first step consists of a condensation reaction of an alcohol, diol, amine or a diamine with maleic or itaconic anhydride to yield intermediates of formulae

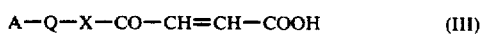

or 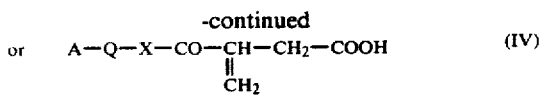    (IV)

Said intermediates can also be prepared through transesterification with lower-alkyl esters of maleic, fumaric or itaconic esters such as mono- and dimethyl esters of maleic fumaric or itaconic acids. The most useful starting material for the intermediate of structure III is maleic anhydride. Methyl-maleic acid and chloro-maleic acid derivatives can be used in the process of this invention, but give unpractically low yields of the desired end-product.

In the second step a base catalyzed addition reaction of perfluoroalkyl alkylene thiol $R_f$—$R^1$—SH and an intermediate of formula III or IV is carried out.

The group Q is a polyether, polyester or siloxane diradical. Following are illustrative examples of polyether diradicals:

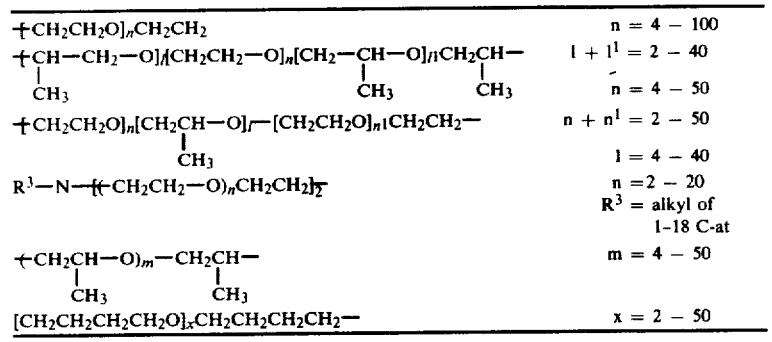

Examples of polyester-diol diradicals are those derived from diacids and diols, for instance alkylene glycol polyadipate, polysebacate, polyisophthalate, polyorthophthalate, polyterephthalate, polymaleate, polyglutarate and the like; such polyester diols may be based on a mixture of several diols and diacids and are commercially available as polyurethane prepolymers in a molecular weight range from 400–5000.

Examples of polysiloxanes are:

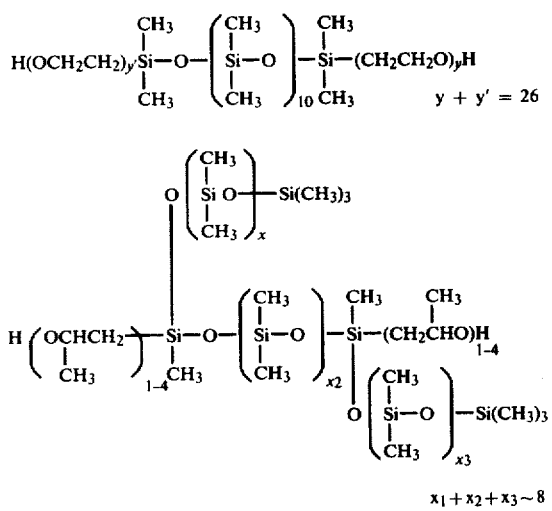

Examples of the alcohols, diols and amines useful in the preparation of intermediates III and IV are listed below:

polyethylene oxide, MW 200–5000
polypropylene oxide, MW 200–5000
methoxy polyethylene oxide, MW 500–2500
poly-tetramethylene oxide, MW 3000–6000
poly(ethylene-co-propylene oxide) block polymers (PLURONICS and Reverse PLURONICS from BASF-Wyandotte)
ethoxylated alkyl phenol (IGEPALS-TRITONS from GAF Corp. and Rohm and Haas Corp.) where alkyl group is octyl or nonyl and the ethoxylated group contains from 5 to 50 ethylene oxide units
ethoxylated primary and secondary amines (Ethomeen, Armour Chemicals) of 8 to 20 carbons
ethoxylated fatty acids and amides (Ethomids, Armour Chem.) of 8 to 20 carbons
alkoxylated alcohols and diols of 8 to 20 carbons
bis(2-amino propyl)ethers of polyethylene oxide and polypropylene oxide (Jeffamine ED and D; Jefferson Chem 6).

Siloxane diols and triols (Code 1248, Q4–3557m Q4–3667; DOW Corning Corp.)

Ethoxylated mercaptans of 8 to 20 carbons

The perfluoroalkyl thiols employed in the preparation of the compounds of this invention are well known in the prior art. For example, thiols of the formula $R_f$—$R^1$—SH have been described in a number of U.S. Pat. Nos. including 2,894,991; 2,961,470; 2,965,677; 3,088,849; 3,172,190; 3,544,663 and 3,655,732.

Thus, U.S. Pat. No. 3,655,732 discloses mercaptans of formula $R_f$—$R^1$—SH where $R^1$ is alkylene of 1 to 16 carbon atoms and $R_f$ is perfluoroalkyl and teaches that halides of formula $R_f$—$R^1$—hal are well known; reaction of $R_f$I with ethylene under free-radical conditions gives $R_f(CH_2CH_2)_aI$ while reaction of $R_fCH_2I$ with ethylene gives $R_fCH_2(CH_2CH_2)_aI$ as is further taught in U.S. Pat. Nos. 3,088,849; 3,145,222, 2,965,659 and 2,972,638.

U.S. Pat. No. 3,655,732 further discloses compounds of formula

R—$R^1$—X—$R^{11}$—SH where $R^1$ and $R^{11}$ are alkylene of 1 to 16 carbon atoms, with the sum of the carbon atoms of $R^1$ and $R^{11}$ being no greater than 25; $R_f$ is perfluoroalkyl of 4 through 14 carbon atoms and X is —S— or NR'''— where R''' is hydrogen or alkyl of 1 through 4 carbon atoms.

U.S. Pat. No. 3,544,663 teaches that the mercaptan $$R_f CH_2CH_2SH$$

where $R_f$ is perfluoroalkyl of 5 to 13 carbon atoms, can be prepared by reacting the perfluoroalkyl alkylene iodide with thiourea or by adding $H_2S$ to a perfluoroalkyl substituted ethylene ($R_f$—CH=$CH_2$), which in turn can be prepared by dehydrohalogenation of the halide $R_f$—$CH_2CH_2$—hal.

The reaction of the iodide $R_f$—$R^1$—I with thiourea followed by hydrolysis to obtain the mercaptan $R_f$—$R^1$—SH is the preferred synthetic route. The reaction is applicable to both linear and branched chain iodides. Many useful perfluoroalkoxyalkyl iodides are described in Australian Application No. 36868 filed Apr. 24, 1968, of general formula $$(CF_3)_2CFO\ CF_2CF_2(CH_2CH_2)_mI$$

where
m is 1-3.

Particularly preferred herein are the thiols of formula $$R_f CH_2CH_2SH$$

where $R_f$ is perfluoroalkyl of 6 to 12 carbon atoms. These $R_f$-thiols can be prepared from $R_f CH_2CH_2I$ and thiourea in very high yield.

Illustrative examples of preferred perfluoroalkylalkylenethiols are:

$$C_4F_9CH_2CH_2SH$$

$$C_6F_{13}CH_2CH_2SH$$

$$C_8F_{17}CH_2CH_2SH$$

$$C_{10}F_{21}CH_2CH_2SH$$

$$C_{12}F_{25}CH_2CH_2SH$$

$$\begin{array}{c}CF_3\\ \diagdown\\ \phantom{xx}CFO(CF_2CH_2)_{1-3}-CH_2CH_2SH\\ \diagup\\ CF_3\end{array}$$

Especially preferred perfluoroalkylalkylenethiols are:

$$C_6F_{13}CH_2CH_2SH$$

$$C_8F_{17}CH_2CH_2SH$$

$$C_{10}F_{21}CH_2CH_2SH$$

and mixtures thereof.

Synthesis of the novel nonionic surfactants is most conveniently carried out in two steps: the first step consists of reacting the cyclic anhydride, most commonly maleic anhydride, with the hydroxy or amino substituted nonionic compound either in bulk or in a common dry and aprotic solvent; useful solvents include ketones, such as acetone and methylethyl ketone; ethers, such as diethylether or ethylene glycol - dimethylether, or tetrahydrofuran; esters, such as ethyl acetate or methyl Cellosolve acetate; amides, such as dimethylformamide or N-methyl pyrrolidone. While amines react rapidly at room temperature, hydroxy compounds have to be heated for several hours to 50°-100° C. The second step involves addition of the perfluoroalkyl alkylene thiol to the intermediate maleic half ester or half amide in the presence of basic catalysts, such as triethylamine, pyridine, or tetramethyl ammonium hydroxide. Addition of the thiol to the mixture often leads to heterogeneous, 2-phase system, which will turn into a homogeneous solution, as the reaction proceeds. This reaction step is preferably carried out between 30° and 75° C. under a nitrogen blanket and with good stirring.

The compounds of this invention can also be prepared by reversing the order of reactions described above; that is, first carry out the base catalyzed addition of a perfluoro substituted thiols to maleic anhydride followed by the ring opening with the hydroxy or amino substitute nonionic compound.

Such fluorochemical surfactants are useful to improve or impart properties such as: wetting, penetration, spreading, leveling, foam stability, flow properties, emulsification, dispersion, and oil and water repellency. Based on these unique properties are numerous applications, some of which follow. Although applications are suggested for a particular use area, the general applicability of each concept is inferred for other applications.

PLASTICS AND RUBBER INDUSTRY

Emulsifying agent for polymerization, particularly fluoromonomers

As a latex stabilizer

To aid in the preparation of agglomerates of powdered fluorocarbon polymers

In synergistic mixtures with hydrocarbon surfactants to wet low energy surfaces including natural and synthetic rubbers, resins, plastics As an adjuvant for foam applications and as foaming agents to aid in leak detection As a foam additive to control spreading, crawling, edge buildup As mound release agents, for silicones, etc.

In refractory processes

As an anti-mist film former

Additive for elimination of trapped air in plastic laminates

Wetting agent for resin molds for definition, strength

Hot-melt additive for oil and grease repellency

Resin additive for improved wetting of and bonding with fillers

Flow modifier for extruding hot melts: spreading, uniformity, anti-cratering

Adjuvant for resin etchant

Mold release agent, demoulding agent

Retarder for plasticizer migration or evaporation

Internal antistatic agent for polyolefins

Antiblocking agent for polyolefins

PETROLEUM INDUSTRY

As a film evaporation inhibitor for gasoline, jet fuel, solvents, hydrocarbons

In extreme pressure EP lubricants

TEXTILE AND LEATHER INDUSTRIES

Soil release and soil proofing agent

Oil/water repellent textile and leather treatment

Wetting agent to improve coverage and penetration of pores of substrates
Anti-foaming agent in textile treatment baths
Wetting agent for finish-on-yarn uniformity
Penetrating agent for finishes on tow, heavy denier fibers
Emulsifying agent/lubricant/ for fiber finishes
Cleaner/metal treating agent for polymerization equipment
Flow modifier for spinning of hot melts, solutions
Additive for fabric finishes for spreading, uniformity
Wetting agent for dyeing
Penetration aid for bleaches
Wetting agent for binder in nonwoven fabrics

PAINT, PIGMENT AND FINISHING INDUSTRIES

Leveling, anti-cratering adjuvant for finishes and paints
Adjuvant for control of soiling
Agent to control differential evaporation of solvents
Leveling agent for floor waxes
Adjuvant for waxes to improve oil and water repellency
Adhesion improver for oily or greasy surfaces
To combat pigment flotation problems
Improver for automotive finishes, based on water-based coatings in which the pigments are rendered nonreactive
Pigment grinding aid to promote wetting, dispersion, color development
Foam generator substance for the application of dyes, inks
Electrolytic conversion coatings

MINING AND METALWORKING INDUSTRIES

In cleaning agents for property improvement
Additive for solvent cleaning
Additive for metal pickling baths to increase bath life and acid runoff
Additive for chrome electroplating: surface tension reduction, foaming
Additive for soldering flux, especially for electronic circuitry
Protective agent for coatings (tarnish resistance, grease repellency)
Corrosion inhibitor
Additive for etchant solution for improved definition
Plastic preplate and silicon etchant technology
In soldering flux for microelectronics to reduce foaming
In chemical roughing agent solutions, prior to galvanization
As a colloidal dispersion aid for magnetic solids
Protective coatings for aluminum and as an anti-blocking agent
Wetting agent for leaching copper ores and as a fresh flotation agent
To promote ore wetting and quicker breaking of the protective oxide layer

PHARMACEUTICAL INDUSTRY

Improve the properties and penetration of antimicrobial agents
Improve the properties of biochemicals, biocides, algicides, bacteriocides, and bacteriostats
Improve the strength, homogeneity, and reduce the permeability of encapsulated materials
Emulsify fluorochemical blood substitutes

AGRICULTURE AND FORESTRY

Wetting agent for herbicides, fungicides, weed killers, hormone growth regulators, parasiticides, insecticides, germicides, bactericides, nematocides, microbiocides, defolients and fertilizers
As an ingredient in chemosterilents, insect repellents and toxicants
For wettable powder pesticides and chemical powders
Corrosion inhibitor for chemical applicators
Wetting agent for foliage
Wetting additive for live stock dips, or to wet sheep skins during desalination
Wetting adjuvant for manufacture of plywood veneer
Penetrant for preservative impregnation
Pulping aid
For cleaning tubes in paper making, dyeing
Grease/oil repellents for paper

FIRE FIGHTING

Wetting agent for fighting forest fires
Ingredient of AFF, aqueous film forming extinguishing agents
Component of fluoroprotein foams
Additives to dry chemical extinguishing agents
Agent in aerosol-type extinguishers
Wetting agent for sprinkler water

AUTOMOTIVE, BUILDING MAINTENANCE AND CLEANING

Wetting agent for cleaning compositions
Additive for alkaline cleaners
Glass cleaner
Wetting agent for automobile waxes
Adjuvant to improve oil/water repellency of wax
Lubricant/corrosion inhibitor for antifreeze
Rinse-aid for car wases
In dry cleaning compositions and solvent cleaners, for water displacement and foaming. May improve soil suspension and decrease redeposition
Foaming agents for pipe cleaning
Anti-mist film foamer for glass and plastics
In foams for dust supression
For acidic concrete cleaners
Bubble foamer for air tracing, in ventilating systems

HOUSEHOLD, COSMETIC AND PERSONAL PRODUCTS

Rinse-aid for dishwashing
Liquid polishing compositions
Floor polish leveling agent
Additive for alkaline oven cleaners
Synergistic improver for disinfectants
Carpet cleaners
Synergistic wetting agent in detergent formulations
Additive for protective coatings on metals (tarnish resistance, grease resistance)
Gloss and antistatic improver
Hair shampoo ingredient
Shaving foam ingredient
Oil and water repellent cosmetic powders ingredient
Ingredient of lotions or creams for skin or hair
Ingredient of skin protection creams

PHOTOGRAPHY AND GRAPHIC ARTS

Printing ink additive for ink flow and leveling, both aqueous and solvent based
Wetting agent for writing inks To combat pigment flooding and flotation in printing inks To form ink repellent surfaces for waterless lithoplates, or electrographic coatings Prevent reticulation of gelatin layers and improve uniformity Assist in film drying Improve film coatings and reduce "contraction flecks"

Wetting, leveling, anti-cratering assist agent

Surfactant for developer solutions

Photoemulsion stabilizer

Prevent photo-lubricant agglomeration

Coating aid in the preparation of multiple layer film elements

Antistatic wetting agent for film coatings

Antifogging agent for films

Bonding agent for fillers and fluoropolymer films

In coatings for nematic liquid crystal cells

The examples below are presented for illustrative purposes only and do not limit the scope of the invention. In the examples the surface tension was measured with a DuNouy tensiometer at 0.1% concentration in water at 25° C.

EXAMPLE 1

Synthesis of:

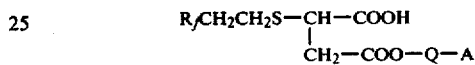

2.5 g (0.0255 mol) maleic anhydride in 2.5 g methylethyl ketone were added to 25 g (0.025 mol) polyethylene oxide of molecular weight MW=1000 and stirred for 12 hours at 75° C. under a nitrogen blanket. At this time, infrared analysis showed no anhydride bands left at 1780 cm$^{-1}$ and 1850 cm$^{-1}$.

11.8 g perfluoroalkyl-ethylmercaptan* (0.025 mol) of average molecular weight 478 were added together with 0.2 g triethylamine as catalyst (0.002 mol) and the mixture stirred for 12 hours at 50° C. The initially opaque white mixture turned clear after three hours. The clear solution was dried in vacuo at 80° C. for 5 hours. The product is a soft wax which is soluble in water.

*The perfluoroalkyl moiety $R_f$ has a distribution of 27% $C_6$, 50% $C_8$ and 23% $C_{10}$.

| Elemental Analysis: | C | H | F |
|---|---|---|---|
| Calc.: | 47.6 | 6.3 | 19.7 |
| Found: | 46.0 | 6.3 | 18.1 |

EXAMPLE 2–12

Using the procedure of Example 1, compounds of structure

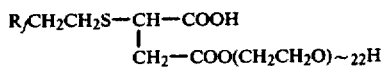

were prepared with hydroxy compounds listed below.

Surface tension was measured for each sample, including Example 1 for a 0.1% solution in water.

| Example | Nonionic Moiety HO—Q—A | Elemental[1] Analysis C | H | F | $\gamma s\ [\frac{Dynes}{cm}]$ 0.1% in $H_2O$ |
|---|---|---|---|---|---|
| 1 | Polyethyleneoxide MW 1000 (Carbowax 1000) | 47.6 46.0 | 6.3 6.3 | 19.7 18.1 | 27.1 |
| 2 | N-stearyl-dipolyethoxy (15) amine - (Ethomeen 18-25) | 48.9 50.9 | 6.9 7.5 | 20.6 19.4 | 28.0 |
| 3 | Polypropoxy (31) bis-polyethoxy(26) diol (Pluronic L-64) | 54.3 54.7 | 8.4 9.4 | 9.0 6.7 | 23.7 |
| 4 | Polyethoxy (23) bis-polypropoxy (29) diol (Pluronic 17R4) | 53.6 53.7 | 8.6 8.3 | 9.9 8.3 | 21.2 |
| 5 | Methoxy polyethylene oxide (Carbowax 750) | 43.3 44.5 | 5.8 6.3 | 23.4 20.4 | 19.7 |
| 6 | Nonylphenoxy poly-ethylene oxide (Igepal CO) (20) | 49.3 50.7 | 6.6 7.1 | 19.2 16.2 | 25.9 |
| 7 | Octylphenoxy poly-ethylene oxide (IGEPAL-CA) (30) | 50.2 50.2 | 7.1 7.2 | 14.5 14.3 | 18.4 |
| 8 | Polysiloxane diol (DC Q4-3667) | 41.1 40.6 | 7.0 6.9 | 11.1 10.4 | 28.4 |
| 9 | Polypropylene oxide (Pluracol 1010) | 49.5 49.7 | 7.1 7.3 | 19.9 18.7 | not soluble |
| 10 | Poly-n-butylene oxide (Polymeg 1000) | 51.4 54.0 | 7.2 7.9 | 19.7 17.8 | not soluble |
| 11 | Polysiloxane triol; MW 6000 (DC 1248 liquid) ⅓ mol | — — | — — | 12 11.7 | not soluble |
| 12 | Polysiloxane diol; MW 800 (DC - Q4-3557) ½ mol | — — | — — | 31.8 31.9 | not soluble |

[1]Calculated
Found

EXAMPLE 13-16

Using the procedure of Example 1, compounds of structure:

$$C_6F_{13}CH_2CH_2SCHCOOH$$
$$|$$
$$CH_2CNH-CH-CH_2O-(CH_2CH_2O)_x-CH_2CH-NHC-CH_2$$
$$\| \quad\quad | \quad\quad\quad\quad\quad\quad\quad\quad\quad\quad | \quad \|$$
$$O \quad\quad CH_3 \quad\quad\quad\quad\quad\quad\quad\quad CH_3 \;\; O$$

$$R_fCH_2S-CH-COOH$$
$$|$$
$$CH_2-CONH-Q-A$$

was prepared with the amino compounds listed below.

| Ex. | | Elemental Analysis* | | | $\delta s \left[\frac{dynes}{cm}\right]$ 0.1% |
|---|---|---|---|---|---|
| | | C | H | F | |
| 13 | Polyoxdiamine $\overline{MW}$ 600 | 45.2 | 6.4 | 20.3 | 31.3 |
| | (Jeffamine ED-600)** | 44.5 | 6.4 | 21.0 | |
| 14 | Polyoxdiamine $\overline{MW}$ 1000 | 42.1 | 5.6 | 27.4 | 31.3 |
| | (Jeffamine ED-900) | 43.7 | 6.0 | 25.4 | |
| 15 | Polyoxdiamine $\overline{MW}$ 2000 | 48.8 | 7.5 | 12.0 | 36.0 |
| | Jeffamine ED-2000) | 49.5 | 8.0 | 11.0 | |
| 16 | Polypropylene oxide diamine | 53.9 | 8.4 | 12.0 | not |
| | (Jeffamine D-2000) | 54.7 | 8.8 | 11.7 | soluble |

*The first set of analytical figures are calculated and those below are actually found.
**Jeffamine is the tradename of Jefferson Chemical for bis-3-aminopropyl ethers of polyethylene oxide (ED) and polypropylene oxide (D).

EXAMPLE 17

Reaction Product of Carbowax-600, Maleic Anhydride and 1,1,2,2-Tetrahydroperfluorooctyl Mercaptan $$C_6F_{13}CH_2S-CHCOOH$$
$$|$$
$$CH_2COO\;\;(CH_2CH_2O)_xH$$
$$\text{where } x = 13$$

Maleic anhydride (0.0255 moles, 2.5 g) dissolved in 10 g acetone was added to Carbowax-600 (0.0255 moles, 15.3 g) and stirred overnight with triethylamine catalyst (2.5 moles %).

Infrared spectrum showed no anhydride bands left at 1780 cm$^{-1}$ and 1850 cm$^{-1}$.

1,1,2,2-tetrahydroperfluorooctyl mercaptan (0.0255 m, 9.64 g) was added and the reaction was stirred at room temperature for 2 days before TLC showed no unreacted mercaptan. The clear solution was dried under vacuum to give 23.0 g of a clear white oil (83.8% yield).

Infrared analysis was consistent for the structure.

| Elemental analysis for $C_{38}H_{60}F_{13}O_{17}S$ | | | |
|---|---|---|---|
| | C | H | F |
| Calc: | 42.84 | 5.69 | 22.93 |
| Found: | 42.56 | 5.84 | 22.08 |

Surface tension of a 0.1% solution in water was 27.7[dynes]/cm.

EXAMPLE 18

Reaction Product of Jeffamine ED-900, [1] Maleic Anhydride and 1,1,2,2-Tetrahydroperfluorooctyl Mercaptan $$HOOC-CHSCH_2CH_2C_6F_{13}$$
$$|$$
$$CH_2CNH-CH-CH_2O-(CH_2CH_2O)_x-CH_2CH-NHC-CH_2$$
$$\| \quad\quad | \quad\quad\quad\quad\quad\quad\quad\quad\quad\quad | \quad \|$$
$$O \quad\quad CH_3 \quad\quad\quad\quad\quad\quad\quad\quad CH_3 \;\; O$$
$$\text{where } x = 18$$

Maleic anhydride (0.0255 moles, 2.5 g) was added to Jeffamine ED-900 (0.01275 moles, 11.86 g) in 10 g acetone and the reaction was stirred for 24 hours (IR shows no anhydride bands at 1780 cm$^{-1}$ and 1850 cm$^{-1}$).

1,1,2,2-tetrahydroperfluorooctyl mercaptan was added and the reaction was stirred overnight at room temperature. TLC showed no traces of unreacted mercaptan.

The clear yellow solution was dried under vacuum to give 26.17 g of a clear yellow viscous oil (99.7% yield). Infrared analysis was consistent for the structure.

| Elemental analysis for $C_{66}H_{102}F_{26}N_2O_{25}S$ | | | |
|---|---|---|---|
| | C | H | N | F |
| Calc: | 42.16 | 5.47 | 1.49 | 26.18 |
| Found: | 42.62 | 6.04 | 1.56 | 24.26 |

A 0.1% solution in water together with 0.1% Triton X-100 had a surface tension of 23.8[dynes]/cm.
[1] bis-3-aminopropyl ether of polyethylene oxide −900.

EXAMPLE 19

Example 1 is repeated using the following R$_f$-thiols:

$$CF_3$$
$$\searrow$$
$$\quad\quad CF-O-(CF_2-CF_2)_2-CH_2CH_2SH$$
$$\nearrow$$
$$CF_3$$

$$CF_3$$
$$\searrow$$
$$\quad\quad CF-O-CF_2CF_2-CH_2CH_2SH$$
$$\nearrow$$
$$CF_3$$

$$C_8F_{17}-CH_2CH_2-SH$$

to give the corresponding water soluble surfactants.

What is claimed is:

1. Perfluorinated substituted half esters and amides having the formula $$R_f-R'-S-(CH_2)_y-CH-COOH$$
$$|$$
$$CH_2-CO-X-Q-A$$

wherein

R$_f$ is straight or branched chain perfluoroalkyl of 4 to 18 carbon atoms or said perfluoroalkyl substituted by perfluoroalkoxy of 2 to 6 carbon atoms;

R$_1$ is branched or straight chain alkylene of 1 to 12 carbon atoms, alkylenethioalkylene of 2 to 12 carbon atoms, alkyleneoxyalkylene of 2 to 12 carbon atoms or alkyleneiminoalkylene of 2 12 carbon atoms where the nitrogen atom contains as a third substituent, hydrogen or alkyl of 1 to 6 carbon atoms;

X is oxygen or NH;

Y is 1 or zero;

Q is a polyether or polyester diradical moiety having a molecular weight of 300 to 500, or a polysiloxane having 5 to 80 repeating units; and A is hydrogen, hydroxyl, alkoxy of 1 to 21 carbon atoms, phenoxy, alkylphenoxy of 7 to 12 carbon atoms, or the group

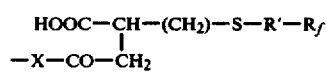

2. A compound according to claim 1 wherein $R_f$ is straight or branched chain perfluoroalkyl of 6 to 12 carbon atoms;

$R'$ is alkylene of 1 to 6 carbon atoms;

Y is zero; and

A is hydroxyl, methoxy or alkylphenoxy of 7 to 15 carbon atoms.

3. A compound according to claim 2 wherein Q is polyalkyleneoxy of 10 to 15 repeating units.

4. A compound according to claim 3, wherein the polyalkyleneoxy is polyethyleneoxy.

5. A compound according to claim 1, wherein $R_f$ is straight of branched chain perfluroalkyl of 6 to 12 carbon atoms;

$R'$ is ethylene;

Y is zero;

X is oxygen: and

A-Q is polyethyleneoxide of MW 400–2000; polypropoxy (having 10–50 repeating units) bis-polyethoxy (10–20) diol; polyetnoxy (10–50), bis-polypropoxy (10–50); methoxy polyethyleneoxide of MW 400–2000; nonylphenoxy polyethylene (5–50) oxide, or octylphenoxy polyethylene (5–50) oxide.

6. A compound of claim 5 wherein $R_f$ has the distribution 27% (±5%) $C_6$, 50% (±5%) $C_8$ and 23% (±5%) $C_{10}$.

7. A compound according to claim 1 of the formula

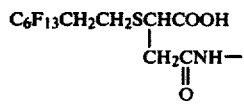 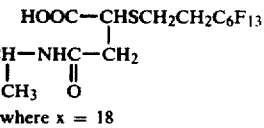

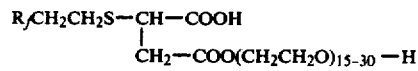

where x = 18

8. A mixture of compounds of claim 1 having the formula $R_fCH_2CH_2S$—CH—COOH
　　　　　　　|
　　　　　　　$CH_2$—COO$(CH_2CH_2O)_{15-30}$—H wherein $R_f$ has a distribution of 27% (±5%) $C_6$, 50% (±5%) $C_8$ and 23% (±5%) $C_{10}$.

* * * * *